United States Patent
Konada

[19]

[11] Patent Number: 5,994,691
[45] Date of Patent: Nov. 30, 1999

[54] NEAR-FIELD SCANNING OPTICAL MICROSCOPE

[75] Inventor: Takeshi Konada, Suginami-ku, Japan

[73] Assignee: Olympus Optical Co., Ltd., Tokyo, Japan

[21] Appl. No.: 08/982,696

[22] Filed: Dec. 2, 1997

[30] Foreign Application Priority Data

Dec. 3, 1996 [JP] Japan .................................. 8-322897

[51] Int. Cl.$^6$ .................................................. G02B 21/00
[52] U.S. Cl. ......................... 250/234; 250/306; 250/307; 73/105
[58] Field of Search .................................. 250/216, 234, 250/235, 306, 307; 73/105

[56] References Cited

U.S. PATENT DOCUMENTS

| | | | |
|---|---|---|---|
| 5,418,363 | 5/1995 | Elings et al. | 250/306 |
| 5,479,024 | 12/1995 | Hillner et al. | 250/458.1 |
| 5,811,796 | 9/1998 | Marchman et al. | 250/234 |

FOREIGN PATENT DOCUMENTS 8-29342  2/1996  Japan .

OTHER PUBLICATIONS

Van Hulst et al., "Near–field optical microscopy in transmission and reflection modes in combination with force microscopy", The Royoal Microscopical Society, Journal of Microscopy, vol. 171, Pt. 2, Aug. 1993, pp. 95–104, /NSOM/SURVEY/AFM/.

*Primary Examiner*—David Nelms
*Assistant Examiner*—John R. Lee
*Attorney, Agent, or Firm*—Pillsbury Madison & Sutro LLP

[57] ABSTRACT

A near-field scanning optical microscope is constructed so that a probe is placed close to a surface of a specimen and while the surface of the specimen is scanned with the probe, a region proximate to the surface of the specimen is measured with light. The microscope includes a mechanism for vibrating the probe in a direction nearly perpendicular to the surface of the specimen on scanning; a mechanism for detecting a distance between the surface of the specimen and the probe; and a mechanism for storing signals detected by scanning operation in the direction nearly perpendicular to the surface of the specimen as at least two measured data strings formed in accordance with a sampling table. In this way, the three-dimensional data on the surface of the specimen are acquired.

15 Claims, 5 Drawing Sheets

NEAR-FIELD SCANNING OPTICAL MICROSCOPE

BACKGROUND OF THE INVENTION

1. Field of the Invention

This invention relates to a near-field scanning optical microscope in which a probe is placed closed to the surface of a specimen and while the surface of the specimen is scanned with the probe, a region proximate to the surface of the specimen is measured with light.

2. Description of Related Art

A near-field scanning optical microscope (which is hereinafter abbreviated to NSOM), in contrast with an optical microscope whose resolving power is restricted by a diffraction limit, is designed so that a probe whose aperture or radius of curvature of the tip is smaller than the wavelength of light used for measurement is placed close to the surface of a specimen, which is scanned with the probe to measure optical properties in a minute area of the specimen. This NSOM is such that, for example, in an aperture probe, if the aperture diameter of its tip is 50 nm, the resolving power corresponds to about 50 nm, while in a scattering probe, the resolving power corresponds to the order of the radius of curvature of the probe tip (several tens of nanometers). In this way, the NSOM brings about the resolving power corresponding to the size of the outside diameter of the probe tip (several tens of nanometers). Thus, the application of the NSOM to the field of industry or medicine is particularly expected.

NSOMs are available in a variety of structural types. For example, in view of techniques of acquiring optical information, there are structures in which illumination light is rendered incident on the back surface of the specimen so that evanescent light produced above the front surface (which is hereinafter referred to simply as the surface) of the specimen is introduced through the probe; those in which illumination light is rendered incident on the surface of the specimen so that scattered light produced from the specimen is introduced into the probe with a minute aperture; and those in which illumination light is emitted from the probe with a minute aperture toward the specimen so that transmitted light or scattered light of the specimen is introduced.

The measurement of a distance between the surface of the specimen and the probe where a region proximate to the surface of the specimen is scanned, involves the use of a technique of utilizing intensity attenuation characteristics of evanescent light in a traveling direction of the evanescent light and a perpendicular direction to detect the evanescent light produced on the surface side of the specimen by rendering illumination light incident on the back surface of the specimen, or a technique of utilizing an atomic force microscope (AFM) to detect the displacement of the probe caused by a force exerted between the specimen and the probe.

In each of the NSOMs having the mechanisms mentioned above, the distance between the surface of the specimen and the probe, the position of the probe, or the intensity of light detected is held constant, and at the same time, the region proximate to the surface of the specimen is scanned. In this way, the NSOM is capable of measuring the surface profile of the specimen and a difference in an optical constant (absorptance, refractive index, etc.) to an order that cannot be done with an ordinary optical microscope.

For the measurement of a device, which diminishes in size, utilizing light (for example, an integrated optical device, such as a photoswitch, which has been considerably studied in recent years or a device having an angular component parameter such as a directivity pattern of radiation intensity of a minute emitting element), three-dimensional information on the surface of the device is required. A conventional NSOM, however, is capable of measuring nothing but a two-dimensional plane nearly parallel to the surface of the specimen in the region proximate to the specimen. Thus, for such a specimen in which the conventional NSOM is required to measure the three-dimensional information it becomes necessary for the position of the probe for scanning be shifted to make measurements many times and often. Moreover, the results of individual measurements must be synthesized for interpretation.

As mentioned above, whenever the position of the probe is shifted, the measurement must be done, and thus the conventional apparatus encounters the problem that unnecessary time is required for measurement. Furthermore, where for measurements such a material that properties of the specimen, including its profile, change with time (namely, the profile is always unstable), there is the drawback that the relation between data derived from individual measurements ceases to be maintainable.

SUMMARY OF THE INVENTION

It is, therefore, an object of the present invention to provide a near-field scanning optical microscope which is capable of making, by a single scan, the mode measurement of a waveguide section of an integrated optical device such as a photoswitch and the measurement of a specimen having an angular component parameter such as a directivity pattern of radiation intensity of a minute emitting element which require the three-dimensional data.

In order to achieve this object, the near-field scanning optical microscope according to the present invention is designed to place a probe close to the surface of the specimen and to measure a region proximate to the surface of the specimen with light while scanning the surface of the specimen with the probe in a direction nearly parallel thereto. The near-field scanning optical microscope includes a mechanism for vibrating the probe in the direction nearly perpendicular to the surface of the specimen during scanning, a mechanism for detecting a distance between the surface of the specimen and the probe, and a mechanism for storing signals detected by scanning the surface of the specimen in the direction nearly perpendicular thereto as at least two measured data strings formed according to a sampling table, so as to obtain the three-dimensional data on the surface of the specimen. The sampling table is made up by any one of three pieces of information including time information, height information, and signal intensity information, or by any combinations thereof.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

The near-field scanning optical microscope of the present invention is such that not only is a certain plane proximate to the surface of the specimen measured but also the measurement can be made in a direction nearly perpendicular to the surface of the specimen, together with a direction nearly parallel thereto, by scanning the surface of the specimen with the probe in a direction nearly perpendicular thereto, and thus the three-dimensional data on the specimen can be acquired.

In the near-field scanning optical microscope of the present invention, detected signals introduced while the surface of the specimen is scanned with the probe in the direction nearly perpendicular thereto are processed into data by the sampling table and then stored. In this case, the position of the probe located in the direction nearly perpendicular to the surface of the specimen is controlled in such a way that it is detected by the mechanism for detecting the distance between the surface of the specimen and the probe.

Here, in the case where the sampling table includes the time information, for example, if sampling is performed at constant time intervals and the probe is moved up and down several times so that data in one perpendicular direction are obtained, it becomes possible to set long sampling intervals. Further, if the height information is contained in the sampling table, sampling which facilitates subsequent data processing can be performed in such a way that, for example, data are obtained by the sampling performed at every constant height. Still further, if the signal intensity information is added to the sampling table, a relatively high degree of accuracy of measurement can be maintained even where a part which changes markedly in intensity of light is measured.

If the sampling table is made up by combining at least two of three pieces of information including the time information, height information, and signal intensity information, it can be applied even to such a case that it is desirable to change a sampling technique in accordance with a part to be measured. For example, even with a specimen having a part which changes rapidly in intensity of light and a part in which there is little change in intensity, it is possible to make good measurements.

Also, if the mechanism of the AFM is used for control of the probe position, stable data will be acquired even in measurements of optically inhomogeneous substances in which it is considered difficult to make control with the evanescent light previously mentioned. When the probe is vibrated in the direction nearly normal to the surface of the specimen, it is, of course, better that its vibrating motion has a period much shorter than scanning time. In this case, there is the advantage that if the probe is vibrated with natural frequency, it can have a great gain and is easy to vibrate. Moreover, if the amplitude of vibration of the probe is made variable, good measurements become possible, irrespective of the extent of a measuring region.

Furthermore, in the near-field scanning optical microscope of the present invention, the data derived in the above ways are placed in a storing mechanism, and thus subsequent processing of various data can be facilitated. Consequently, multidimensional measurements of the specimen become possible and the defects of the prior art can be overcome.

In this way, the near-field scanning optical microscope of the present invention is capable of acquiring the three-dimensional data required for the mode measurement of a waveguide section of an integrated optical device such as a photoswitch and the measurement of the specimen having an angular component parameter such as a directivity pattern of radiation intensity of a minute emitting element.

In accordance with the embodiments shown in the drawings, the present invention will be explained in detail below.

First embodiment

Figure 1:
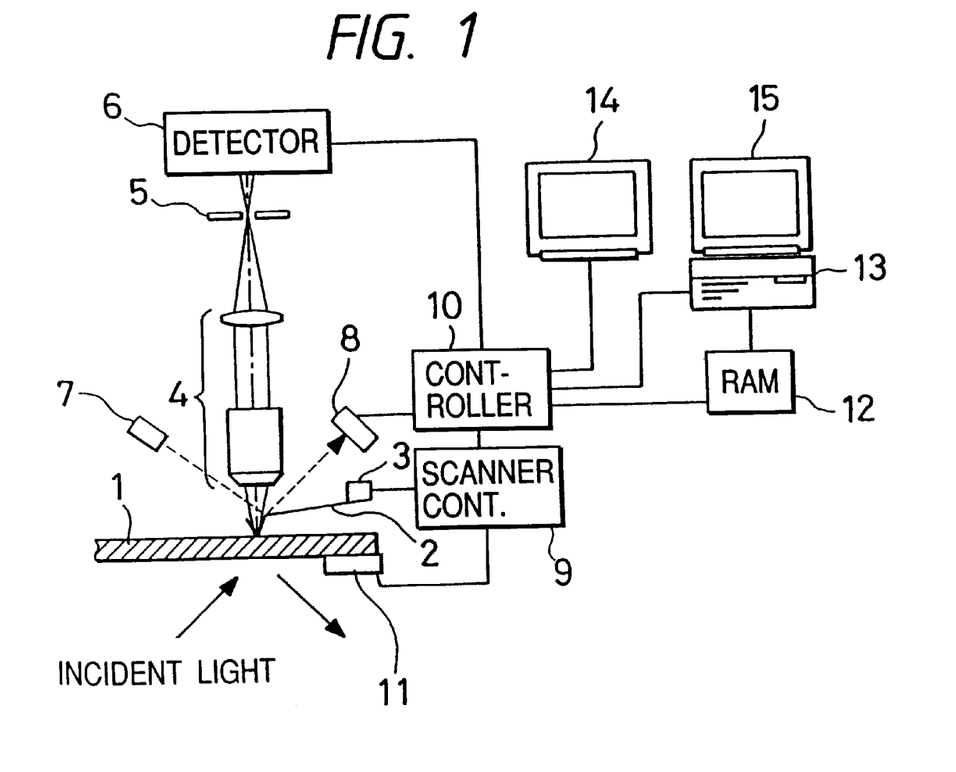
FIG. 1 is a view showing the arrangement of the near-field scanning optical microscope of a first embodiment in the present invention.

FIG. 1 shows the arrangement of the near-field scanning optical microscope (NSOM) of the first embodiment in the present invention. In this embodiment, the mechanism of the atomic force microscope (AFM) is used to control the distance between the surface of the specimen and the probe. In FIG. 1, the essential parts of the AFM are a probe 2, a probe scanner 3, a probe position detecting laser 7, a probe position detecting photodetector 8, and a scanner controller 9. A unit which the AFM has in common with the NSOM includes a controller 10, a scanner 11, a data storing mechanism 12, a computer 13, a monitor 14, and an image processing monitor 15.

The AFM is an apparatus that the probe whose tip has a needle shape is moved close to the specimen and thereby an atomic force exerted between the tip of the probe and the atom of the specimen existing close thereto is utilized to measure the surface profile of the specimen. The probe 2 has a cone—or pyramid-shaped needle with a height of several micrometers at the top of a minute overhang beam called a cantilever, derived from a semiconductor process. The measurement is done by relatively moving the probe 2 along the surface of a specimen 1. However, if the probe 2 encounters a rough surface of the specimen 1 during scanning, it will be pushed or drawn by the atomic force exerted between the specimen 1 and the probe 2, and therefore the cantilever is deflected and inclined. Hence, the cantilever is irradiated with laser light from the probe position detecting laser 7 so that the displacement of reflected light is detected by the probe position detecting photodetector 8. In this way, the roughness of the surface of the specimen 1 can be detected from the deflection of the cantilever.

In practical use, the scanner 11 is moved vertically so that the distance between the surface of the specimen 1 and the probe 2 becomes constant with respect to the roughness of the specimen 1. Since, in this case, the movement of the scanner 11 is made by a control signal (for example, a voltage) from the scanner controller 9, the roughness of the specimen 1 becomes clear from the amount of this control signal. Subsequently, the control signal, after being processed by the computer 13, is displayed on the monitor 14, and thus the surface profile of the specimen is imaged.

The first embodiment, as mentioned above, includes the probe 2 which is provided with a conical needle having a height of several micrometers at the top of a minute overhang beam called the cantilever. This probe is similar to that used in the AFM, but, for use in the NSOM, a part of the probe located on the specimen side is coated with metal so that this metallic coating is removed only at the tip of the needle, at which a minute aperture is formed which is smaller than the wavelength of light used for measurement.

In the NSOM of the first embodiment, an optical lever system, generally used in the AFM, for measuring the position of the probe 2 by the inclination of the cantilever is adopted as a detecting mechanism for the distance between the specimen 1 of a subject to be measured and the probe 2. This detecting mechanism is constructed with the probe position detecting laser 7 and the probe position detecting photodetector 8.

The NSOM of the first embodiment uses the scanner 11 placed on the backside of the specimen 1 in order to move the probe 2 and the specimen 1 in a direction nearly parallel to each other. The scanner 11 can be driven not only in a horizontal direction but also in a direction perpendicular thereto.

In the NSOM of the first embodiment, the scanner 11 is first driven, thereby moving the specimen 1 in the horizontal direction. In this case, to identify the position of the probe 2, laser light emitted from the probe position detecting laser 7 and reflected by the upper face of the probe 2 is received by the probe position detecting photodetector 8, where an electrical signal for detecting the probe position is produced. Subsequently, the signal is delivered through the controller 10 to the scanner controller 9. In the scanner controller 9, after the position of the probe 2 in the direction perpendicular to the surface of the specimen 1 is identified, a control signal is transmitted so that a vertical drive which is actuated in accordance with the surface profile of the specimen 1 is further added to the scanner 11 in order to keep constant the distance between the surface of the specimen 1 and the probe 2. Also, although in this case the specimen 1 is moved for scanning, the probe 2 may be moved.

For the operation of the NSOM, the specimen 1 is first moved in the horizontal direction by the scanner 11, and at the same time, light, existing close to the surface of the specimen 1, produced by incident light on the back surface of the specimen 1 is introduced through the minute aperture of the probe 2 and collected by a condensing optical system 4 using objective lenses for microscopes. The light transmitted through the specimen 1, on the other hand, strikes various portions, for example, edges, of the probe 2 other than the minute aperture and becomes scattered light to enter the optical system. Then, by a confocal detection system having a pinhole 5 for cutting off such unwanted, scattered light from the collected light, only detected light from the minute aperture of the probe 2 is introduced, and the detected light is converted into an electrical signal by a photodetector 6 composed of a photomultiplier tube, etc.

Subsequently, in order to obtain the three-dimensional data, the probe 2 is vibrated in the direction nearly perpendicular to the surface of the specimen 1 by the probe scanner 3 driven by the scanner controller 9 simultaneously with the scan of the specimen 1. The distance between the surface of the specimen 1 and the probe 2, as mentioned above, is detected by the output of the probe position detecting photodetector 8.

Here, if the frequency of the probe 2 is taken as the natural frequency, stable vibrations will be obtained because the gain is greater than in other frequencies when vibrations are applied. In this case, if a so-called AC mode used in the AFM is adopted, a more favorable effect will be brought about. This AC mode is a technique of controlling the distance between the surface of the specimen 1 and the probe 2 by utilizing the fact that as the probe 2 approaches the specimen 1, the amplitude of vibration is reduced by a force with the specimen 1 or a vibration input is out of phase with the vibration of the probe 2. If such a frequency that the quality factor of the natural frequency can be increased is adopted as the frequency of the probe 2, the sensitivity of the detection system can be improved.

In the NSOM of the first embodiment, for the sampling intervals where the data are obtained, the technique used in the AFM is adopted in which the distance between the surface of the specimen 1 and the probe 2 is controlled. Specifically, this technique is such that data sampling is performed in accordance with predetermined time or height, or whenever a signal to be detected changes at a fixed rate. Moreover, the sampling table is previously made up by using any one of the sampling intervals or by combining a plurality of sampling intervals, and the data sampling is performed by the controller 10 through software incorporated in the computer 13.

The technique of sampling data to be obtained will be described below. For the technique of obtaining data strings in accordance with time, there is that of sampling the data at constant time intervals, taking a certain starting point of measurement as a reference. In general, the natural frequency of the probe 2 of the cantilever type is on the order of several tens of kilohertz, while a scanning rate of speed is on the order of a few hertz per line. Hence, for example, where data are available at about 500 points per line in scanning the surface of the specimen 1 in the direction nearly parallel thereto, the probe 2 will vibrate up and down several tens of times in the vertical direction at each point. In this way, there is no need to secure all the data in the vertical direction at that point while the probe 2 vibrates once up and down, and it is only necessary to obtain all the data while the probe 2 vibrates up and down several times. Furthermore, even where it is intended to obtain numerous data in the vertical direction, the sampling time intervals need not be very short, and thus this approach is easily realized even from a technological point of view.

Also, the data thus available have been sampled at constant time intervals. Therefore, in order to determine the spatial position of the probe 2, it becomes necessary that a calculation is made on the basis of the probe position at the sampling starting point, sampling time, amplitude, etc. by the computer 13 to furnish the three-dimensional data. In the NSOM of the first embodiment, since sine-wave vibrations are transformed into the data string at constant time intervals, the probe positions in individual data do not become constant, but by adjusting the sampling intervals, data on an average height can be calculated.

It is, of course, possible to use the sampling table in which the sampling time intervals are changed so that the data of the distances between the surface of the specimen 1 and the probe 2 can be sampled at every constant height. In this case, however, it is necessary that the sampling table is compiled in such a way that calculations are performed on the basis of parameters, such as the vibration frequency and amplitude of the probe 2, by the computer 13 before scanning.

The sampling performed at constant time intervals, on the other hand, is an effective technique for obtaining numerous data in a nearly vertical direction, but this technique has the drawback that errors are produced in the process of controlling the frequency and amplitude of the probe 2.

Where the sampling is performed at every constant height, the position of the probe 2 is detected by the probe position detecting photodetector 8 and is compared with the sampling table in which a constant height and some measured heights determined before scanning are written, and when compared heights coincide, the data string is made up by sampling. This technique is favorable compared with that of sampling the data at constant time intervals because available data, which are directly detected, have a high degree of accuracy, and the data can be acquired as a tetragonal lattice form which represents the three-dimensional data, or as a lattice form which is most suitable for subsequent calculation processing.

The sampling performed by comparing signal intensities is applied to the case where it is expected that the specimen 1 causes an abrupt change of the intensity of light in space, while the sampling performed at every height or at time intervals is used when there is the fear that correction for respective data after having been acquired is not accurately made. If, for example, logarithm is used to compile the sampling table, comparatively accurate data will be obtained even where measured values bring about considerably rapid changes. The data string records, as a reference at the starting point of measurement, a ratio of the height to the intensity at a location where the intensity of a light detecting signal is several times that shown in the sampling table, or to the intensity at the starting point. When it is required that this record is displayed on the monitor 14, calculations are based on the recorded data for display.

An actual measurement may be made by combining the sampling techniques mentioned above. For example, when the data string is made up by the sampling according to time and a rate of change of the detecting signal in the vertical direction is beyond a certain fixed value, the software of the computer 13 may be used in such a way that subsequent sampling is changed to the data sampling performed in accordance with the intensity ratio of the detecting signal.

The data strings obtained by the sampling are stored in sequence in the data storing mechanism 12, which is constructed in RAM (random access memory).

Here, for acquiring data in the NSOM of the first embodiment, for example, if it is assumed that a plane nearly parallel with the specimen 1 is formed of 512×512 points and the data of the height and the light detecting signal are each represented by 2 bytes, the data storing mechanism 12 will require a capacity of 1 megabyte. In view of this respect, to obtain the data of 64 points in the direction nearly perpendicular to the surface of the specimen 1, the RAM with a total of 64 megabytes becomes a necessity.

Also, where the calculation processing on sampling conditions by the sampling table is behind the emission of the light detecting signal, it is only necessary to provide a data buffer for sampling.

Figure 2:
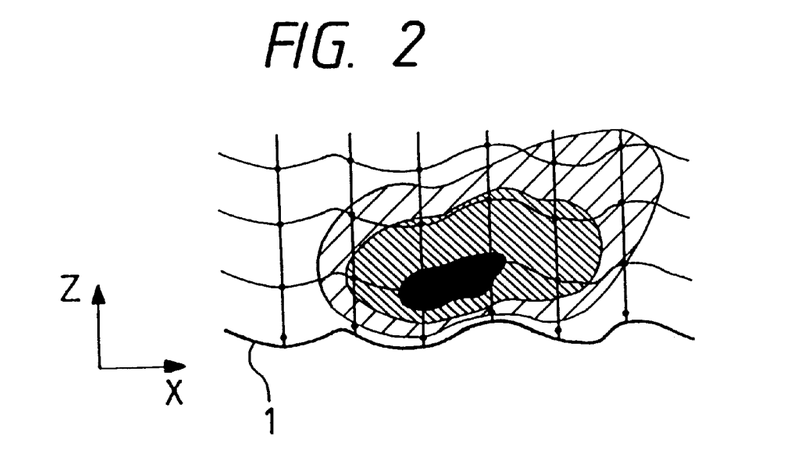
FIG. 2 is a view showing an example of data obtained when the sampling able is set at every constant height in a direction nearly perpendicular to the surface of the specimen in the near-field scanning optical microscope of the first embodiment.
Figure 3:
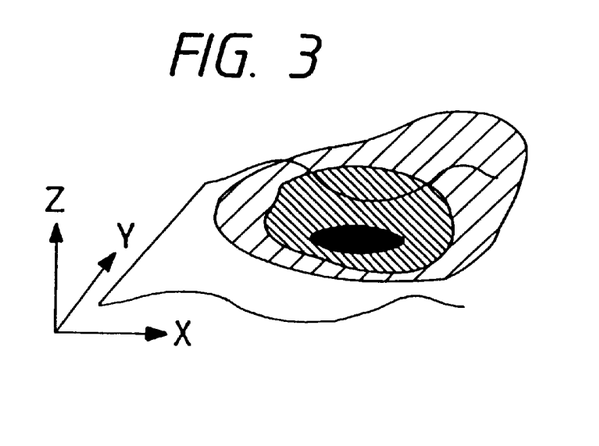
FIG. 3 is a view showing a three-dimensional intensity of light displayed on a monitor for processed images as a perspective view after correcting and processing the data shown in FIG. 2 through a computer.

In accordance with the data obtained by the techniques mentioned above, the NSOM of the first embodiment is capable of displaying the three-dimensional intensity of light relative to the surface of the specimen 1 as an image, and states in this case are shown in FIGS. 2 and 3. FIG. 2 illustrates an example of a data display on the monitor 14 where the sampling table is set at every constant height in the direction nearly perpendicular to the surface of the specimen 1. FIG. 3 illustrates the three-dimensional intensity of light displayed, as a perspective view, on the image processing monitor 15 which is connected to the computer 13, after individual data obtained in FIG. 2 are corrected by the computer 13. In each of these figures, the degrees of intensities of light detecting signals which have been detected are represented by various shades.

Figure 4:
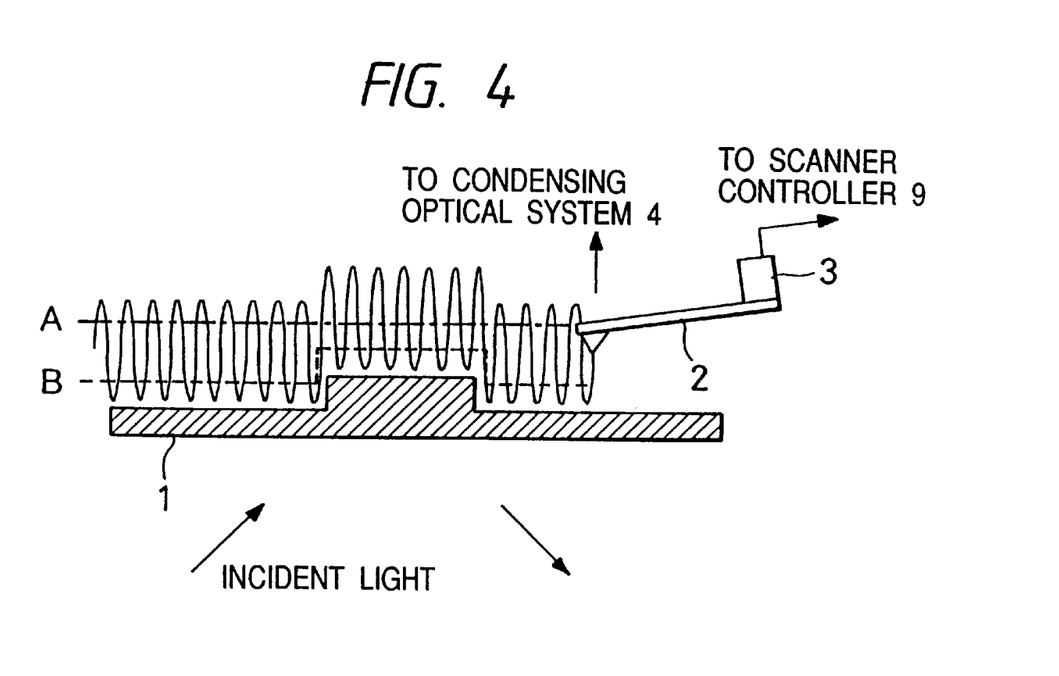
FIG. 4 is a view for explaining a technique of making a constant height mode measurement and a constant distance mode measurement by a single scan in the near-field scanning optical microscope of the first embodiment.

Furthermore, in the NSOM of the first embodiment, a constant height mode measurement A in which the position of the probe 2 placed close to the surface of the specimen 1 is held constant to scan the surface of the specimen 1 and a constant distance mode measurement B in which the distance between the surface of the specimen 1 and the probe 2 is held constant to scan the surface of the specimen 1 can be made by a single scan (Usually, these measurements are separately done). FIG. 4 shows the state of such measurements.

The first data sampling technique for making the measurements is to acquire the data of the plane parallel to the surface of the specimen 1, keeping a constant distance therebetween, as described above (the constant distance mode measurement), and to process the above data through the computer 13, thereby obtaining the data of the constant height mode measurement.

The second technique may be followed such as to obtain the data by setting a sampling table satisfying the following conditions at the same time:

"Distance from the surface of the specimen 1"=constant (the constant distance mode measurement)

and

"Height of the surface profile of the specimen 1 by the AFM"+"Distance from the surface of the specimen 1"=constant (the constant height mode measurement).

Moreover, as mentioned previously, if the probe 2 is vibrated with the natural frequency (the order of several tens of kilohertz), measurements can be made in scanning time which is almost the same as the case where the specimen 1 is scanned without vibrating the probe 2 in the vertical direction. In addition, even where the properties of the specimen 1 including its profile vary with time, it becomes possible to compare the results of the two mode measurements.

Second embodiment

Figure 5:
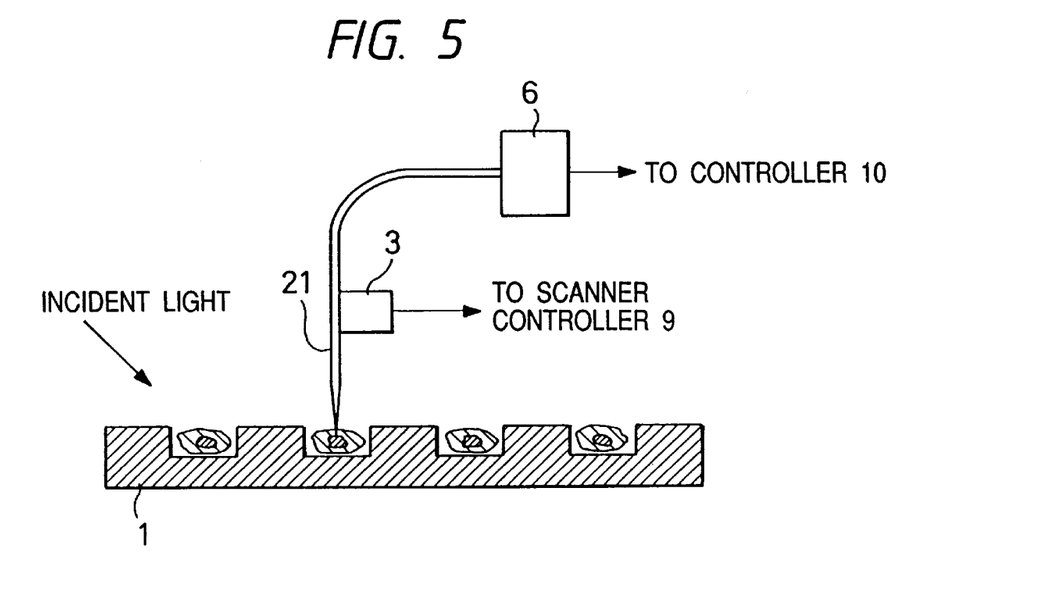
FIG. 5 is a view for explaining the arrangement of the near-field scanning optical microscope in a second embodiment of the present invention.

FIG. 5 shows a probe used in the NSOM of the second embodiment. In this embodiment, a fiber probe 21 is used to measure the intensity of light in space above a grating and is connected directly to the photodetector 6. The fiber probe 21 is constructed so that after a metallic coating is applied to an optical fiber which is pointed by etching or heating, the metallic coating on its tip is removed to provide a minute aperture. With the exception of this probe, the second embodiment has the same arrangement as in the first embodiment.

In the NSOM of the second embodiment, the fiber probe 21 is vibrated in the direction parallel to the surface of the specimen 1 by the probe scanner 3, thereby controlling the distance between the fiber probe 21 and the surface of the specimen 1. The measurement of the specimen 1 is made through a system referred to as shear force detection to which the same principle as in the AC mode described in the first embodiment is applied. In addition to the above vibration, the probe scanner 3 vibrates the fiber probe 21 in the direction nearly perpendicular to the surface of the specimen 1, and thereby the three-dimensional data can be acquired.

For the grating, there is a phenomenon, called anomaly, that when light is incident at a particular angle, the reflectance of the light is reduced. This phenomenon, as shown In FIG. 5, is attributed to the fact that an evanescent field is generated in each of the grooves of the grating, and thereby the energy of incident light is conserved in the groove. Although the phenomenon has been discussed by numerical simulations, what intensity distribution of light is brought about on the surface of the grating cannot be experimentally measured for the reason that the period of the grating is short.

The NSOM of the second embodiment, however, is provided with the above construction and thus is capable of acquiring the three-dimensional data to measure the position or location where the intensity of light is distributed in the groove of the grating. Also, the conventional NSOM can measure only the intensity of light in a region proximate to the surface of the grating.

Third embodiment

Figure 6:
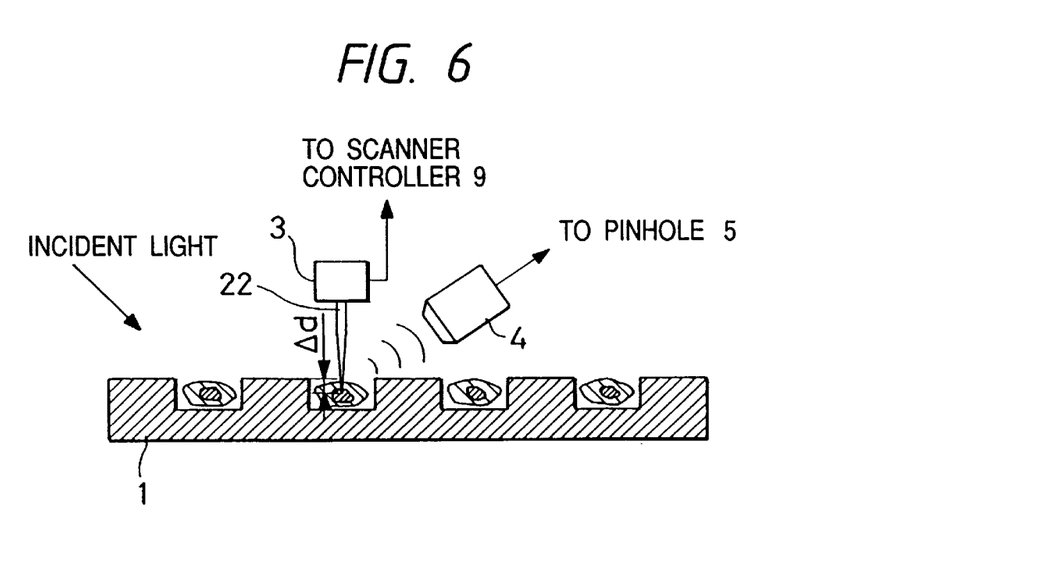
FIG. 6 is a view for explaining the arrangement of the near-field scanning optical microscope in a third embodiment of the present invention.

FIG. 6 shows a probe used in the NSOM of the third embodiment. The NSOM of this embodiment also allows the measurement of the intensity distribution of light in the groove of the grating. The NSOM of the third embodiment is equipped with a scattering probe 22 composed of a metallic needle bringing about a large amount of scattered light. With the exception of this probe, the third embodiment has the same arrangement as in the first embodiment.

The scattering probe 22, in contrast with the aperture probe shown in each of the first and second embodiments, is capable of bringing about a large amount of light detecting signal power. Furthermore, since the aperture need not be provided at the tip of the probe, there is the advantage of enabling the probe to be pointed. In general, the NSOM is often used in combination with the AFM, but where only the AFM is used, it is necessary to improve the resolving power. Thus, it is considered that the scattering probe 22 is unsurpassed in performance.

The scattering probe 22, however, has the disadvantage that scattered light introduced through the tip of the probe is mixed with unwanted scattered light emanating from various portions, except the tip, of the probe 22 and entering the optical system. For example, as shown in FIG. 6, when the intensity distribution of light in the groove of the grating is measured, unwanted scattered light will also be captured which emanates from various portions, except the tip, of the probe 22. This causes the degradation of accuracy of measurement.

Thus, the NSOM of the third embodiment is constructed so that three-dimensional data relative to the specimen 1 are obtained and these data are processed by the computer 13, thereby averting the influence of unwanted scattered light. Specifically, in FIG. 6, a desired amount of scattered light refers to a total amount of scattered light introduced from a region extending from the tip of the scattered probe 22 to the inlet of the groove of the specimen 1 when the probe 22 is inserted in the groove. Hence, by finding the difference between a total amount of scattered light obtained in a region where the tip of the scattering probe 22 is located at a position shifted inside the groove of the specimen 1 by a distance $\Delta d$ from the inlet of the groove and a total amount of scattered light obtained in a region where the tip of the scattering probe 22 is located at the inlet of the groove, it becomes possible to find a total amount of scattered light existing in a region from the inlet of the groove to the distance $\Delta d$. Consequently, if it is possible to find increments of the amount of scattered light obtained in the above-mentioned two regions when the groove is scanned with the scattering probe 22 and to clarify the difference between them, a desired intensity distribution of light in the groove of the grating can be measured.

Thus, in the NSOM of the third embodiment, by acquiring the three-dimensional data relative to the specimen 1 and finding the increments of the amount of scattered light in the two adjacent regions in the direction perpendicular to the surface of the specimen 1 to process a value derived therefrom in the computer 13, the measurement of the intensity distribution of light in the groove is rendered possible.

Fourth embodiment

Figure 7:
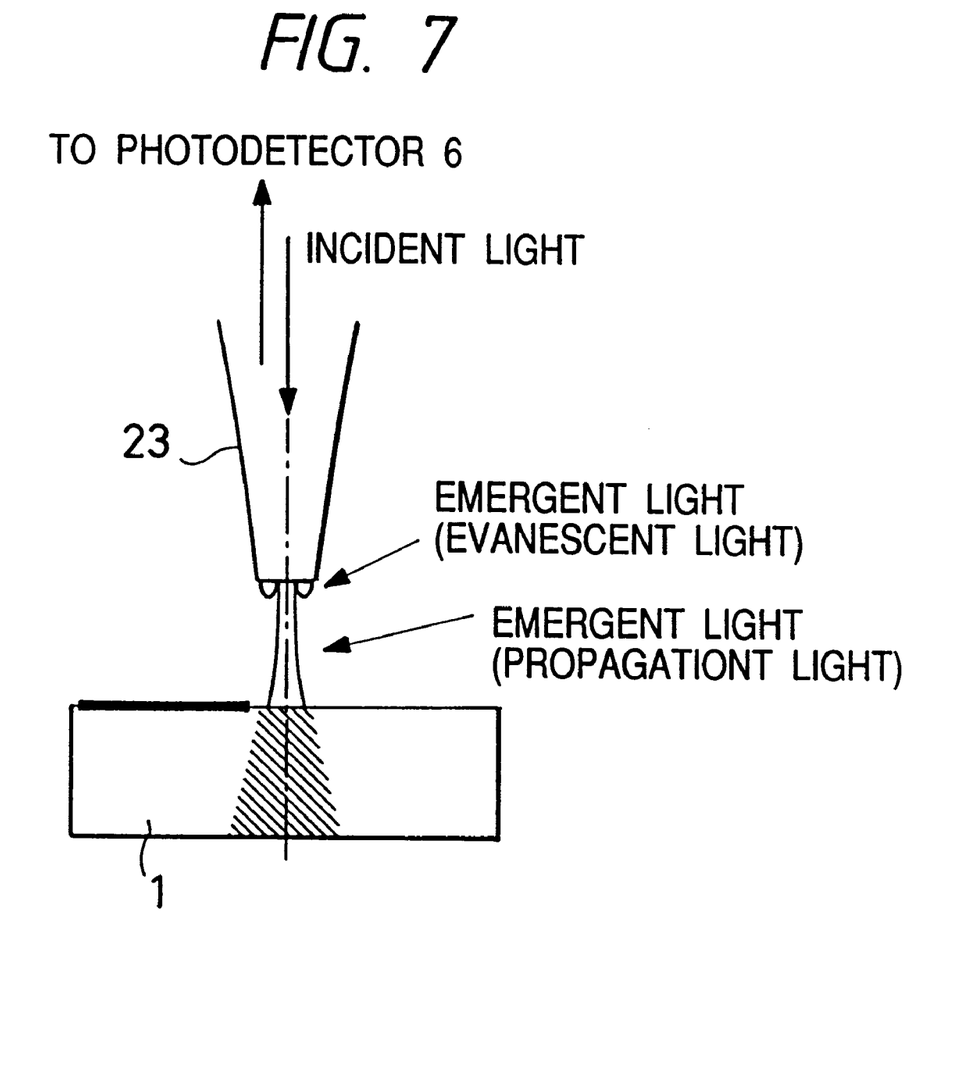
FIG. 7 is a view for explaining the arrangement of the near-field scanning optical microscope in a fourth embodiment of the present invention.

FIG. 7 shows a probe used in the NSOM of the fourth embodiment. The NSOM of this embodiment is designed to have an emission type (illumination type) for irradiating the specimen 1 with light emerging from the tip of a probe 23 to measure light reflected or transmitted by the surface of the specimen 1. Particularly shown in FIG. 7 is the NSOM which is constructed as a reflection mode type for detecting light reflected by the surface of the specimen 1 to detect the light returned through the probe 23. In the fourth embodiment, although a probe constructed of the optical fiber similar to that shown in the second embodiment is used as the probe 23, the probe of the cantilever type of the first embodiment may be used. The NSOM of the fourth embodiment, with the exception that the probe 23 is connected directly to the photodetector 6, has the same arrangement as in the first embodiment.

Generally, in the NSOM, when light is emitted from the minute aperture of the probe 23, evanescent light is produced, close to the probe 23, together with emergent light as propagation light. The evanescent light is little detected, even where it lies at a distance of a fraction of the wavelength of the propagation light (or less) from the propagation light, depending upon the property of the probe 23.

Thus, the NSOM of the fourth embodiment makes use of the difference between intensities detectable in accordance with the distance between the propagation light and the evanescent light mentioned above. Specifically, the probe 23 is vibrated with the amplitude corresponding practically to the wavelength of light used. Subsequently, data obtained when the specimen 1 is irradiated with the propagation light and the evanescent light by holding the probe 23 close to the specimen 1 are compared with data obtained when the specimen 1 is irradiated with only the propagation light by holding the probe 23 farther from the specimen 1. In this way, a difference in the influence of the possible evanescent light on the specimen 1 is measured.

For example, where a metallic thin film is evaporated on part of the specimen 1, free metal electrons are excited in the metallic thin film by the evanescent light to yield the so-called surface plasmon, but the propagation light does not cause the plasmon. According to the NSOM of the fourth embodiment, when the specimen 1 mentioned above is measured, the probe 23 is moved close to, or farther from, the specimen 1, and thereby changes in reflection of the propagation light caused by the possible evanescent light can be measured to determine the position of the metallic thin film.

In the present invention, the sampling table which has been mentioned above refers to a group of parameters describing timing conditions of measurements in sampling in order that signals continuously detected by the photodetector 6 are rendered discrete as measured data.

For example, in the technique of making measurements at every constant height, the sampling table can be compiled from a predetermined index in the system which indicates this sampling technique, values of a difference $\Delta h$ in height between the measuring points and of n indicating how many points are measured in the direction of height for acquiring data in the scanning direction and the direction perpendicular thereto, and a value indicating how many points are measured in the scanning direction.

Figure 8:
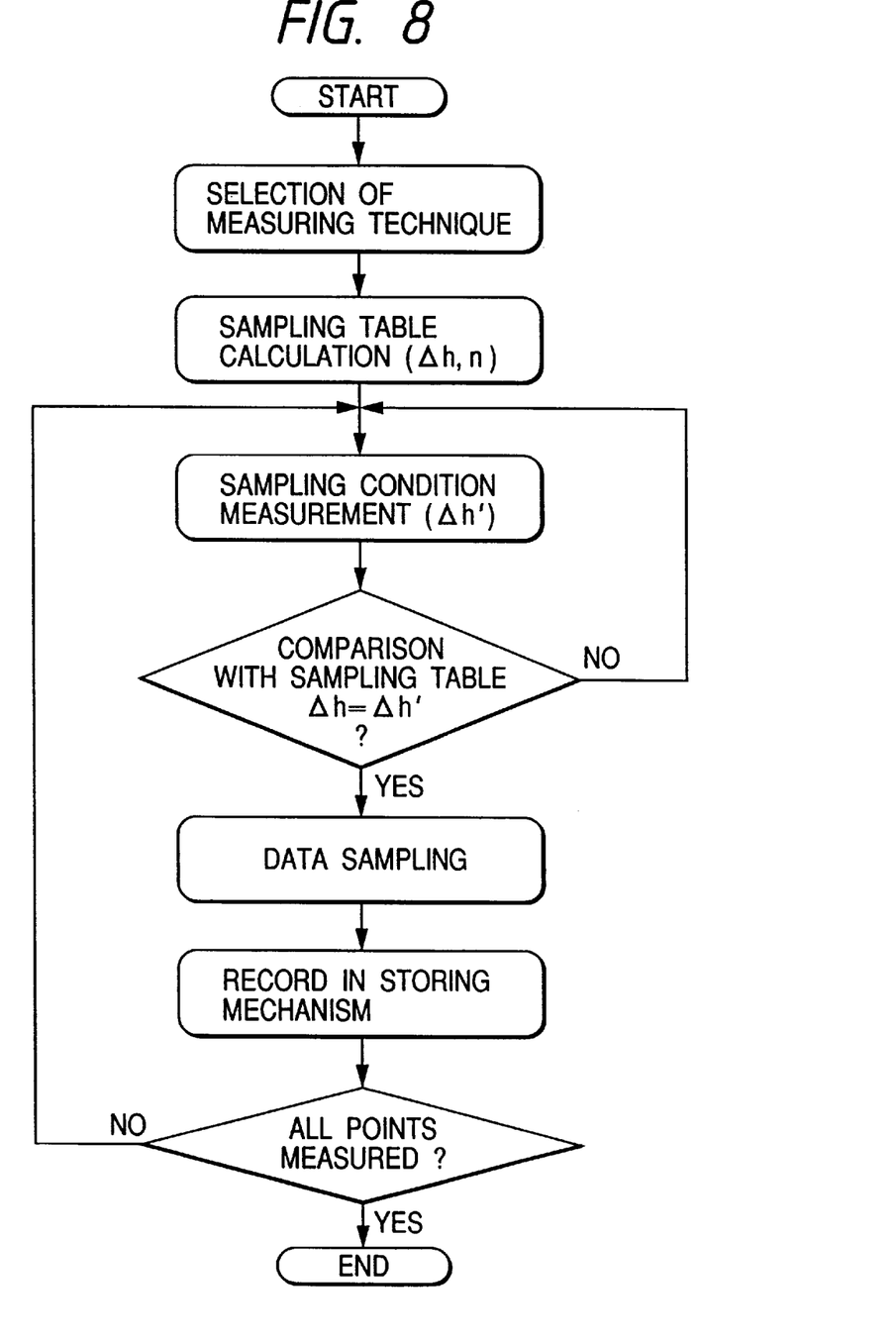
FIG. 8 is a flowchart showing the procedure of measurement in the microscope of the present invention.

As shown in FIG. 8, when a measurer selects a proper measuring technique and inputs, for example, the range of a three-dimensional measurement and the sampling technique by means of an input device like a ten-key or mouse, the values of the sampling table, such as those of Δh and n, can be calculated automatically by software in the computer 13.

When the measurement is done, the sampling data are sent to the controller 10 and the data of sampling conditions (for example, Δh' if the data of height are required) are measured by the controller 10. When the conditions are in agreement with one another (namely, in this case, when the position of the probe 2 is measured and, at the same time, the difference in height between the measuring points reaches Δh), sampling is performed. The data thus obtained are recorded in sequence in the data storing mechanism 12. Where the measurements are completed and their results are displayed, the data are read out from the data storing mechanism 12 and are processed into signals by the computer 13 in order that they are displayed as images with the sampling table of the measuring conditions. In this way, the three-dimensional display can be made.

The data-recorded in the data storing mechanism 12 can be filed under the name of a data file, but, for practical convenience, the sampling table is written in the file and thereby a technique for seeing what is the condition on which the recorded data are measured can also be followed.

Furthermore, where the sampling table is made up by combining a plurality of measuring conditions as described in the embodiments, for example, in a measuring technique switched so that where the measurement is made at every constant height and a threshold is exceeded by which the difference between the data in the intensity of detected light measured at every constant height is determined, the subsequent sampling is performed when the intensity difference becomes constant, the sampling table is compiled from the following parameters: a predetermined index in the system which indicates the sampling technique on a plurality of measuring conditions, values of the difference Δh in height and of n indicating how many points are measured in the direction of height, and the value of a threshold ΔI of the intensity difference between the data. In this case, these parameters are recorded in the data storing mechanism 12 in such a way that an index indicating what sampling technique (the constant height or constant intensity of light) is used for measurement is attached to each of the measured sampling data.

For the sampling table, in addition to the technique of using the parameters in the measurements as mentioned above, it is, of course, possible to following a technique that coordinates of all the measured points are previously calculated in accordance with the measuring technique by the computer 13 to store them as a table for measured points.

What is claimed is:

1. A near-field scanning optical microscope in which a probe is placed close to a surface of a specimen and while scanning of the surface of said specimen with said probe is performed in a direction substantially parallel to the surface of said specimen, a region proximate to the surface of said specimen is measured with light, said microscope comprising:

a first mechanism for vibrating said probe in a direction substantially perpendicular to the surface of said specimen during the scanning in the direction substantially parallel to the surface of said specimen;

a second mechanism for detecting a distance between the surface of said specimen and said probe;

a photodetector for detecting light; and a third mechanism for storing signals detected by said photodetector as light intensity data, wherein while said probe is moving in a direction to approach or withdraw from said sample, light is detected via said probe at least at two different heights of said probe in accordance with a sampling table, said light intensity data thereby being obtained for a three-dimensional space above the surface of said specimen.

2. A near-field scanning optical microscope according to claim 1, wherein said sampling table is made up by any one of three pieces of information including time information, height information, and signal intensity information or any combinations thereof.

3. A near-field scanning optical microscope according to claim 1 or 2, wherein said light intensity data are stored in association with information with respect to positions of said probe at which said light intensity data are obtained.

4. A near-field scanning optical microscope according to claims 1 or 2, wherein said first mechanism vibrates said probe with substantially a natural frequency.

5. A near-field scanning optical microscope according to claim 3, wherein said first mechanism vibrates said probe with substantially a natural frequency.

6. A near-field scanning optical microscope according to claim 4, wherein amplitude of a vibration of said probe is variable.

7. A near-field scanning optical microscope according to claim 5, wherein amplitude of a vibration of said probe is variable.

8. A near-field scanning optical microscope according to claims 1 or 2, wherein a mechanism of an atomic force microscope is used to control the distance between the surface of said specimen and said probe.

9. A near-field scanning optical microscope according to claim 3, wherein a mechanism of an atomic force microscope is used to control the distance between the surface of said specimen and said probe.

10. A near-field scanning optical microscope according to claim 4, wherein a mechanism of an atomic force microscope is used to control the distance between the surface of said specimen and said probe.

11. A near-field scanning optical microscope according to claim 5, wherein a mechanism of an atomic force microscope is used to control the distance between the surface of said specimen and said probe.

12. A near-field scanning optical microscope according to claim 6, wherein a mechanism of an atomic force microscope is used to control the distance between the surface of said specimen and said probe.

13. A near-field scanning optical microscope according to claim 7, wherein a mechanism of an atomic force microscope is used to control the distance between the surface of said specimen and said probe.

14. A near-field scanning optical microscope, comprising:

a probe having a light receiving tip;

a probe scanner mechanically coupled to said probe;

a probe position detecting laser disposed proximate to said probe and arranged to have an optical path to at least a portion of said probe;

a probe position detecting photodetector disposed proximate said probe and arranged to have an optical path to light emitted from said probe position detecting laser and reflected from said probe;

a scanner controller constructed to be in communication with said probe scanner;

a controller constructed to be in communication with said probe position detecting photodetector and said scanner controller;

a scanner constructed to be in communication with said scanner controller and disposed proximate to said probe;

a detector disposed in an optical path of light picked up by said probe through said light receiving tip and constructed to be in communication with said controller;

a data storage unit constructed to be in communication with said controller; and data processing and data output devices constructed to be in communication with said data storage unit and said controller, wherein said probe scanner vibrates said probe in a direction substantially orthogonal to a surface of a specimen being scanned with a period of oscillation that is shorter than a time to scan a subject portion of said surface of said specimen.

15. A method of measuring optical properties using a near-field scanning optical microscope, comprising:

positioning a probe of said near-field scanning optical microscope proximate to a surface of a specimen;

illuminating said surface of said specimen with light;

vibrating said probe of said near-field scanning optical microscope in a direction substantially orthogonal to the most proximate point of said surface of said specimen;

scanning said surface of said specimen with said probe in a direction substantially parallel to said surface;

detecting a distance between said probe and said most proximate point of said surface of said specimen;

detecting light emanating from said surface of said specimen through a tip of said probe and generating signals therefrom;

storing said signals generated in said detecting light emanating from said surface in a data storage medium; and generating a three-dimensional data map from said signals stored in said data storage medium based on a single-pass scan of said surface of said specimen.

* * * * *